Dec. 6, 1932.  A. BRIECHLE ET AL  1,890,074
MULTILENS AERIAL CAMERA
Filed July 7, 1931  9 Sheets-Sheet 1

Inventors
AMBROSIUS BRIECHLE
FREDERICK W. LUTZ
GEORGE RATTRAY
By their Attorneys
Hogue & Neary.

Dec. 6, 1932.        A. BRIECHLE ET AL        1,890,074
MULTILENS AERIAL CAMERA
Filed July 7, 1931        9 Sheets-Sheet 2
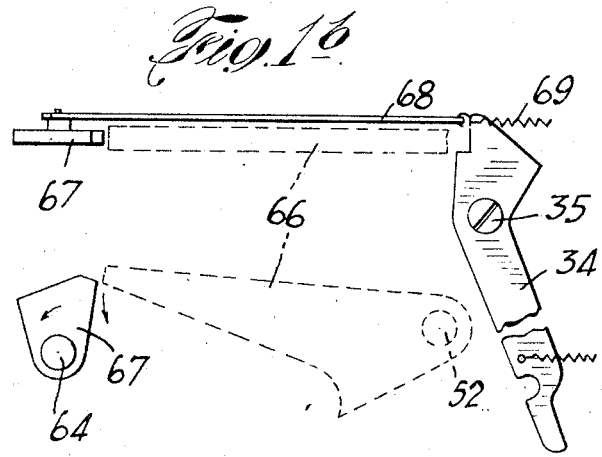
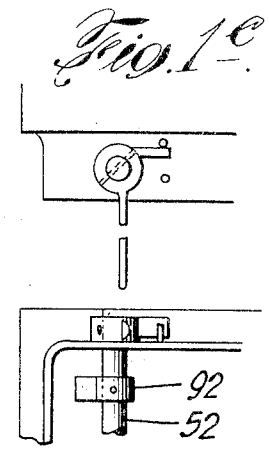
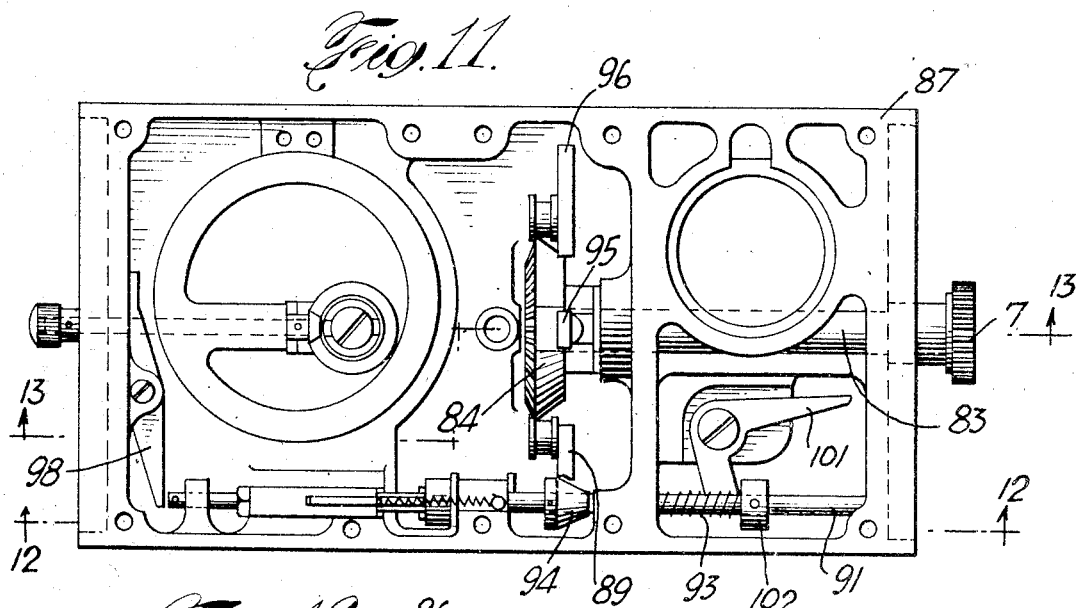
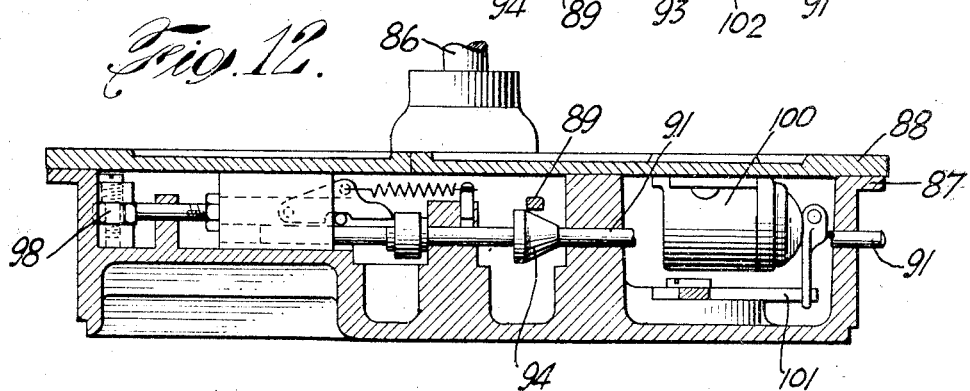
INVENTORS
AMBROSIUS BRIECHLE
FREDERICK W. LUTZ
GEORGE RATTRAY
BY their ATTORNEYS
Hoguet & Neary

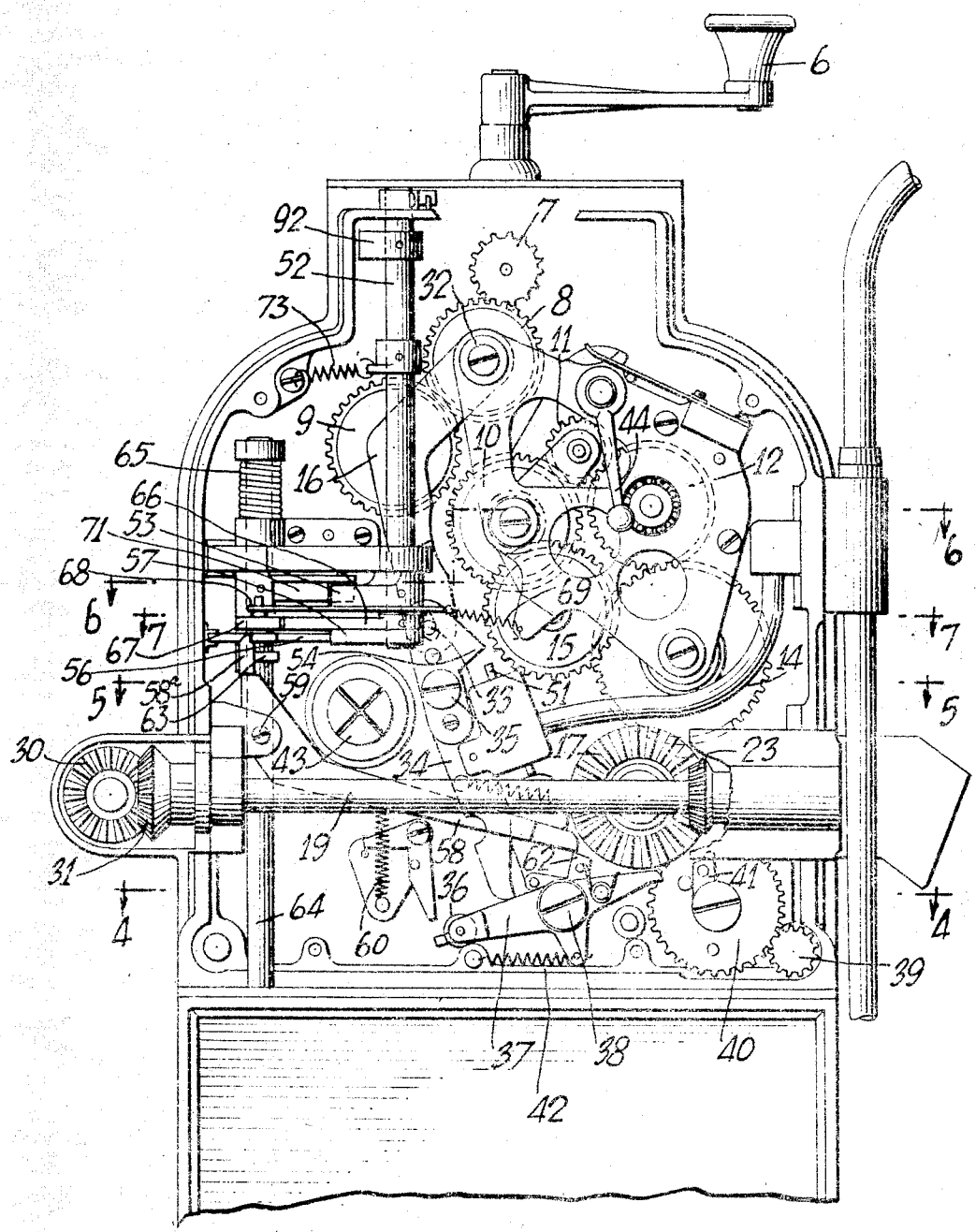

Dec. 6, 1932. A. BRIECHLE ET AL 1,890,074
MULTILENS AERIAL CAMERA
Filed July 7, 1931 9 Sheets-Sheet 4
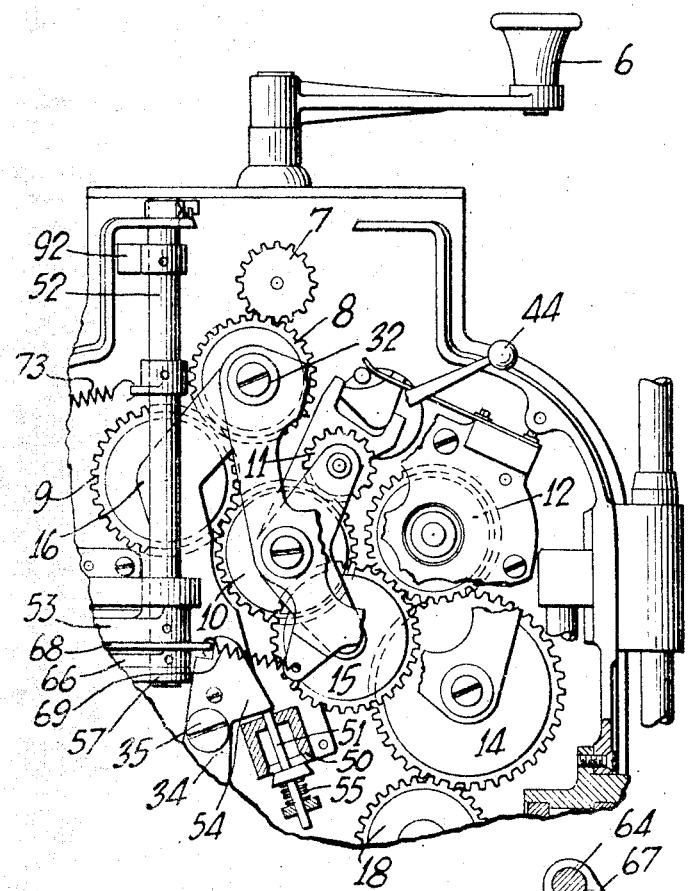
Fig. 3.
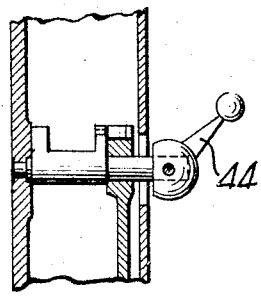
Fig. 3ª.
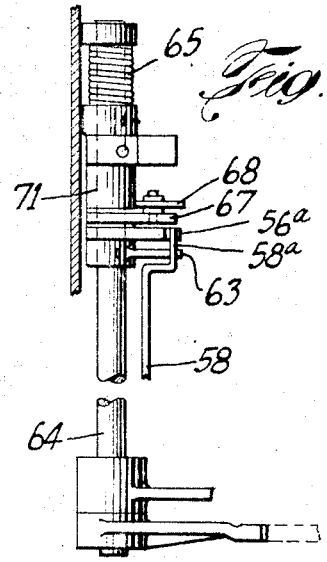
Fig. 3b.
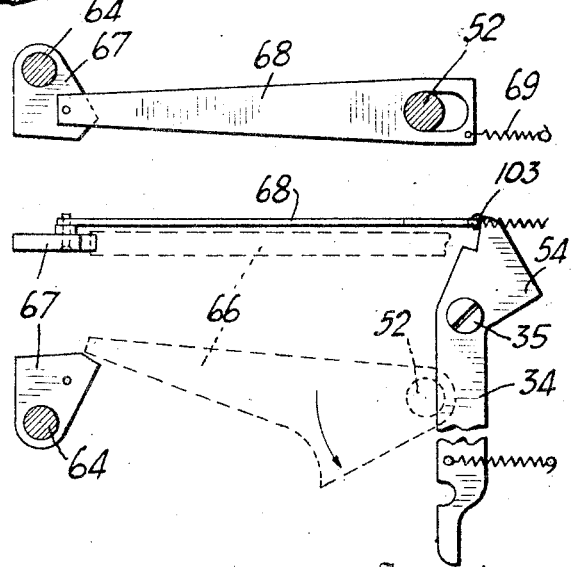
Fig. 1ª.
Inventors
AMBROSIUS BRIECHLE
FREDERICK W. LUTZ
GEORGE RATTRAY
By their Attorneys
Hoguet & Neary Dec. 6, 1932.   A. BRIECHLE ET AL   1,890,074
MULTILENS AERIAL CAMERA
Filed July 7, 1931   9 Sheets-Sheet 5
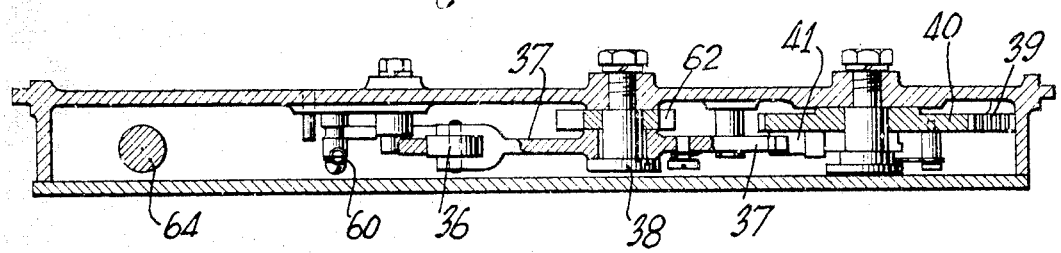
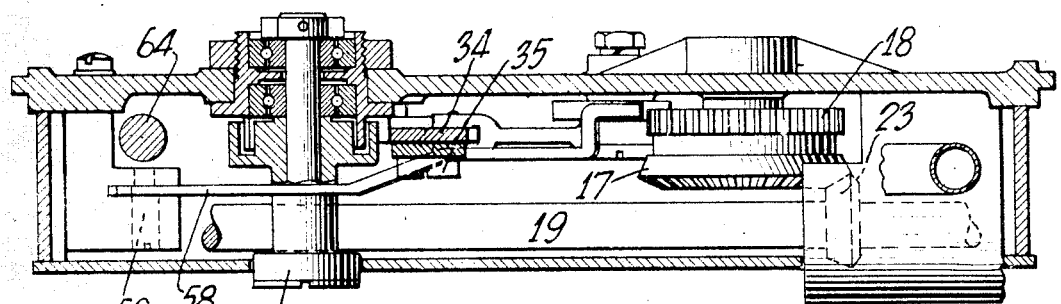
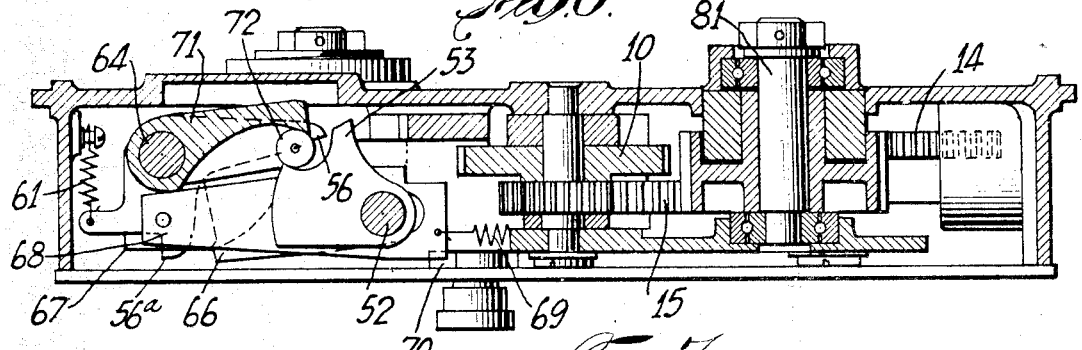
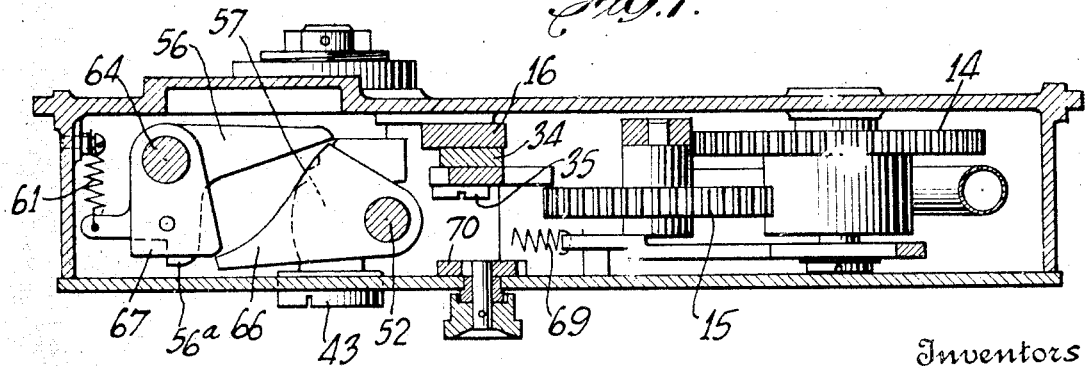
Inventors
AMBROSIUS BRIECHLE
FREDERICK W. LUTZ
GEORGE RATTRAY
By their Attorneys
Hoguet & Neary

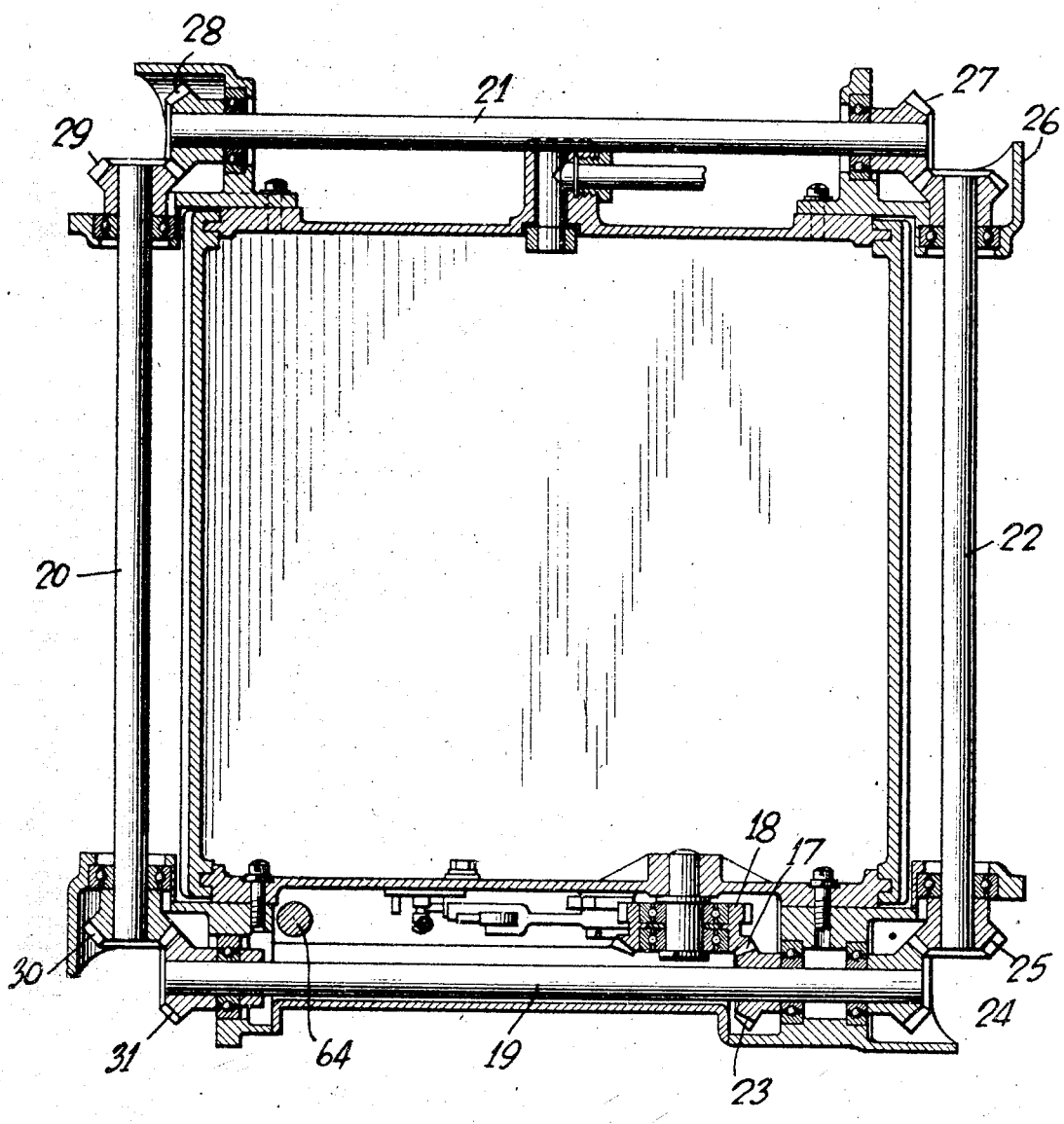

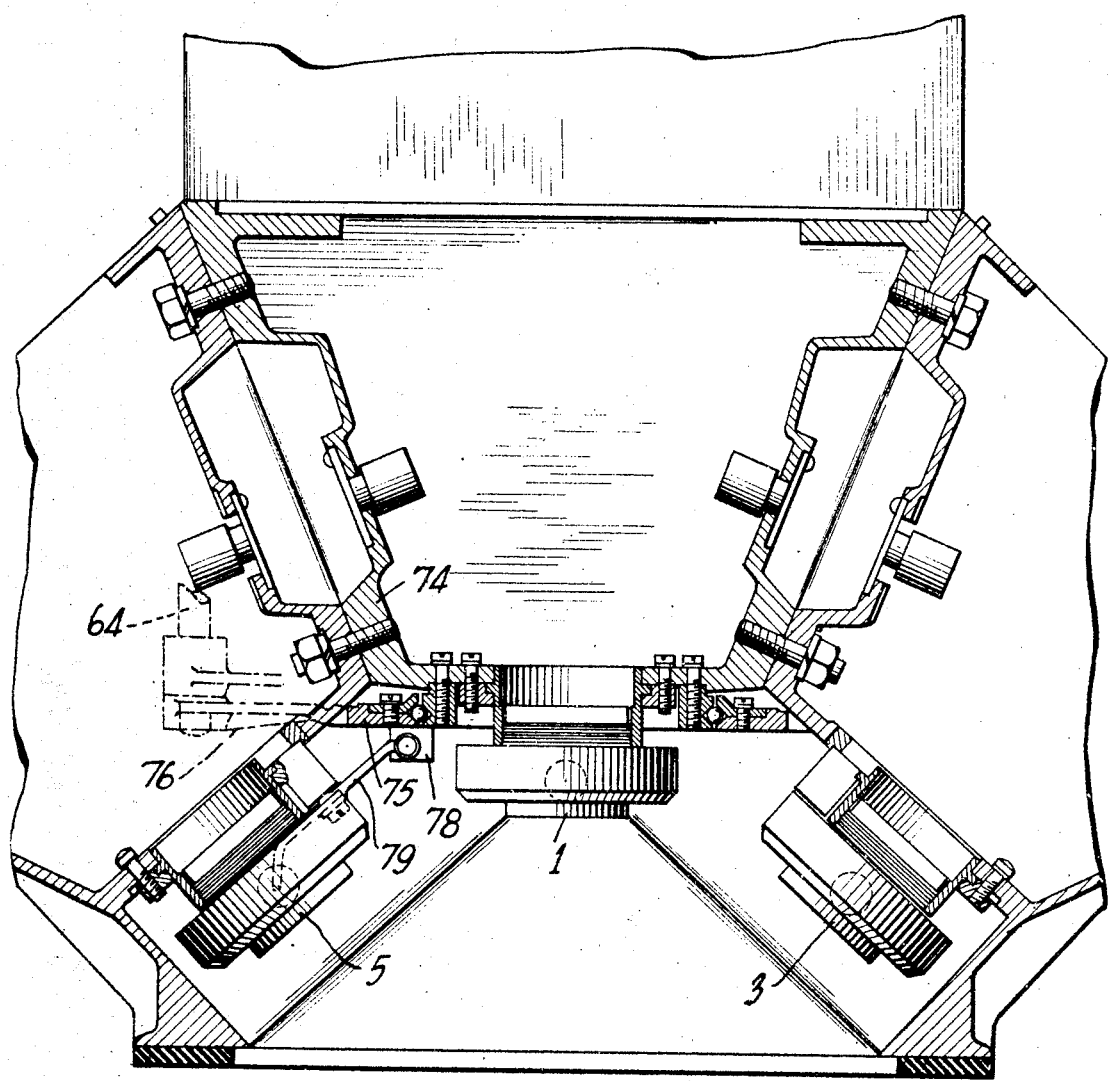

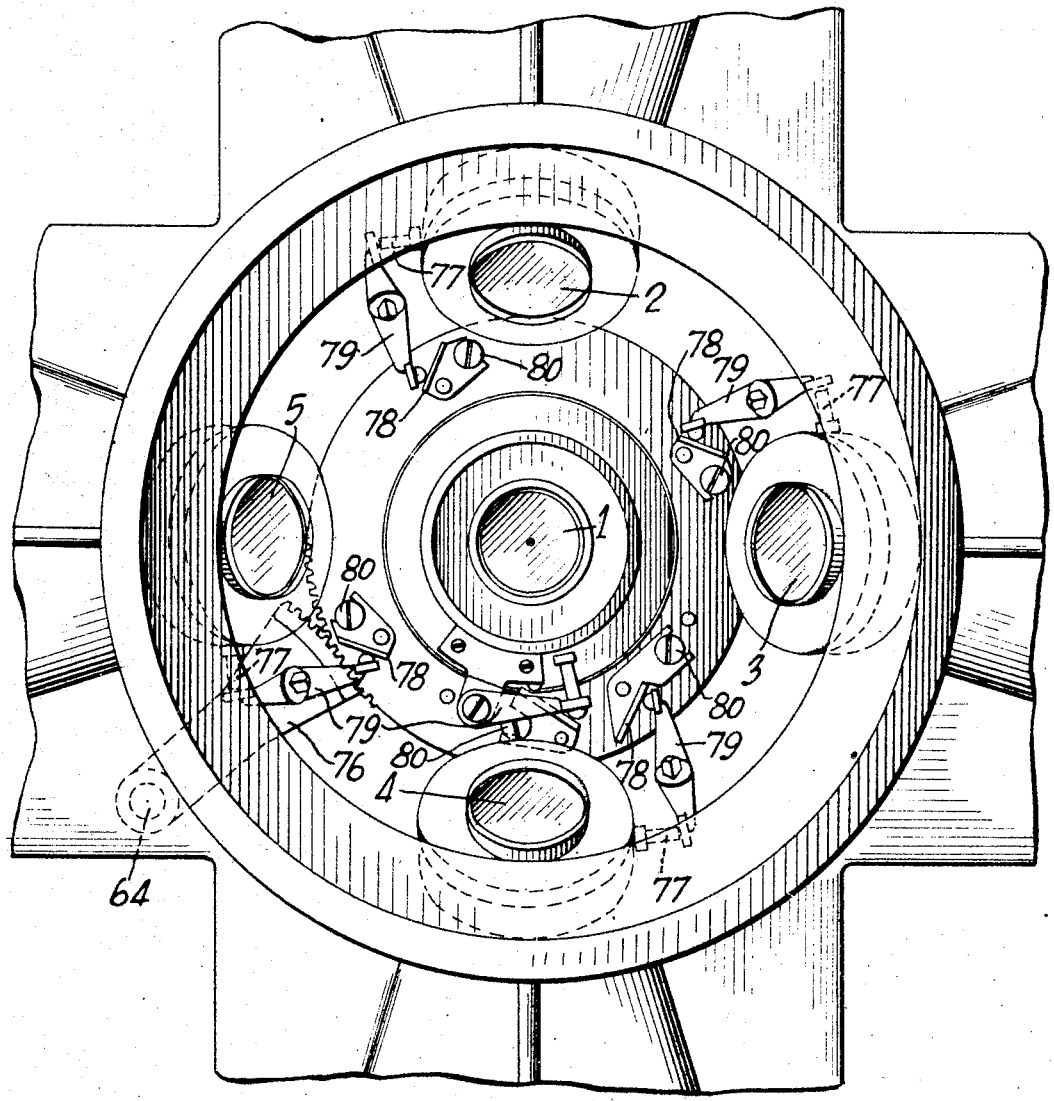

Dec. 6, 1932.   A. BRIECHLE ET AL   1,890,074
MULTILENS AERIAL CAMERA
Filed July 7, 1931    9 Sheets-Sheet 9
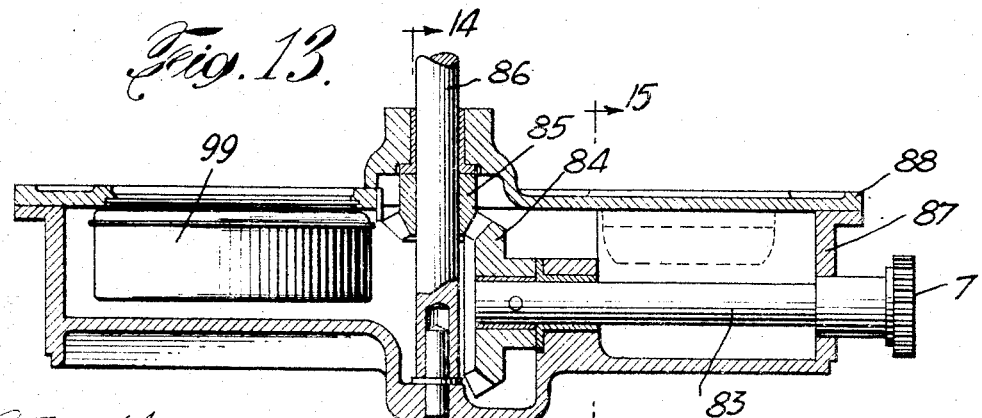
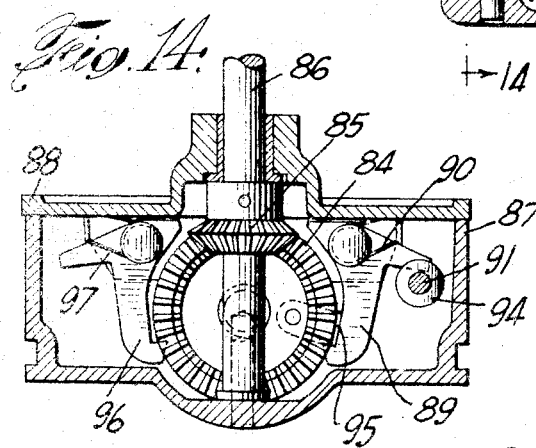
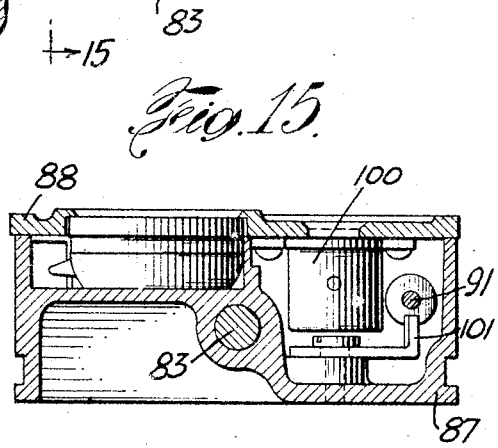
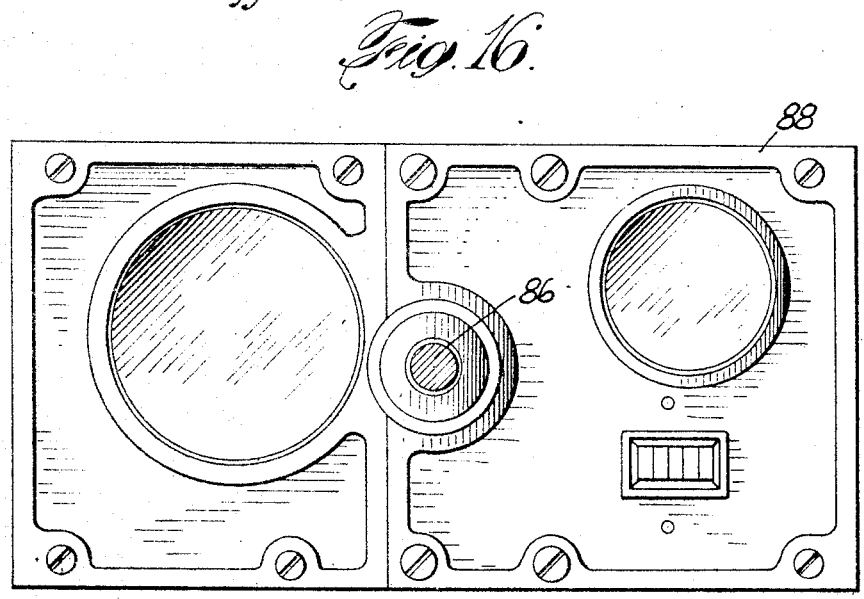
INVENTORS
AMBROSIUS BRIECHLE
FREDERICK W. LUTZ
GEORGE RATTRAY
BY their ATTORNEYS
Hoguet & Neary Patented Dec. 6, 1932

1,890,074

UNITED STATES PATENT OFFICE

AMBROSIUS BRIECHLE, OF BROOKLYN, FREDERICK W. LUTZ, OF FLORAL PARK, AND GEORGE RATTRAY, OF MINEOLA, NEW YORK, ASSIGNORS TO FAIRCHILD AERIAL CAMERA CORPORATION, OF NEW YORK, N. Y., A CORPORATION OF NEW YORK

MULTILENS AERIAL CAMERA

Application filed July 7, 1931. Serial No. 549,156.

This invention relates to improvements in aerial cameras and particularly to those of the multi-lens type, and has for an object to provide means for synchronization of the feeding of film over the several lenses for exposure.

Another object of the invention is the provision of means manually operable with the maximum ease against the minimum amount of friction of parts for winding the film, such means also to consist of a differential gearing device which may be thrown into operation as the effort in winding may dictate.

A further and important object of the invention is the provision of an efficient clutch arrangement, positive in its operation, free from possibility of slippage or binding, the clutch elements by means of their construction and arrangement having inherent characteristic tending automatically toward engagement and disengagement so as to effect the proper engagement and disengagement of parts to be operated by the manual winding of the film winding handle at the proper instant, in accordance with the operation of the camera as a whole.

With the foregoing and other objects in view, the invention resides in the combination of parts and in the details of construction hereinafter set forth in the specification and appended claims, certain embodiments thereof being illustrated in the accompanying drawings, in which:

Figure 1a is a detail view of the shutter trip locking lever in locked position.

Figure 1b is a detail view of the same as Figure 1a in unlocked position.

Figure 1c is a detail view of the shutter tripping lever.

Figure 2 is a view similar to Figure 1, the operative parts being shown in position for tripping the shutter.

Figure 3 is an enlarged view of part of Figure 1 showing the differential gear thrown into different position than that shown in Figure 1; and Figures 3a and 3b are detailed enlargements of parts shown in Figure 3.

Figure 3a is a detail view of the lever for manual operation of the differential.

Figure 3b is a detail view of the lower shaft of the shutter trip control.

Figure 4 is a view in section taken along line 4—4 of Figure 2.

Figure 5 is a view in section taken along line 5—5 of Figure 2.

Figure 6 is a view in section taken along line 6—6 of Figure 2.

Figure 7 is a view in section taken along line 7—7 of Figure 2.

Figure 8 is a plan view of driving shaft arrangement for film winding for the several compartments.

Figure 9 is a view in vertical section through the camera showing the disposition of the angularly disposed lenses to the central lens.

Figure 10 is a bottom plan view of the camera showing the relative positions of the various lenses.

Figure 11 is a top plan view of the camera with the top cover removed.

Figure 12 is a view in section taken along line 12—12 of Figure 11.

Figure 13 is a view in section taken along line 13—13 of Figure 11.

Figure 14 is a view in section taken along line 14—14 of Figure 13.

Figure 15 is a view in section taken along line 15—15 of Figure 13.

Figure 16 is a top plan view of the camera with the winding handle removed.

Figure 1:
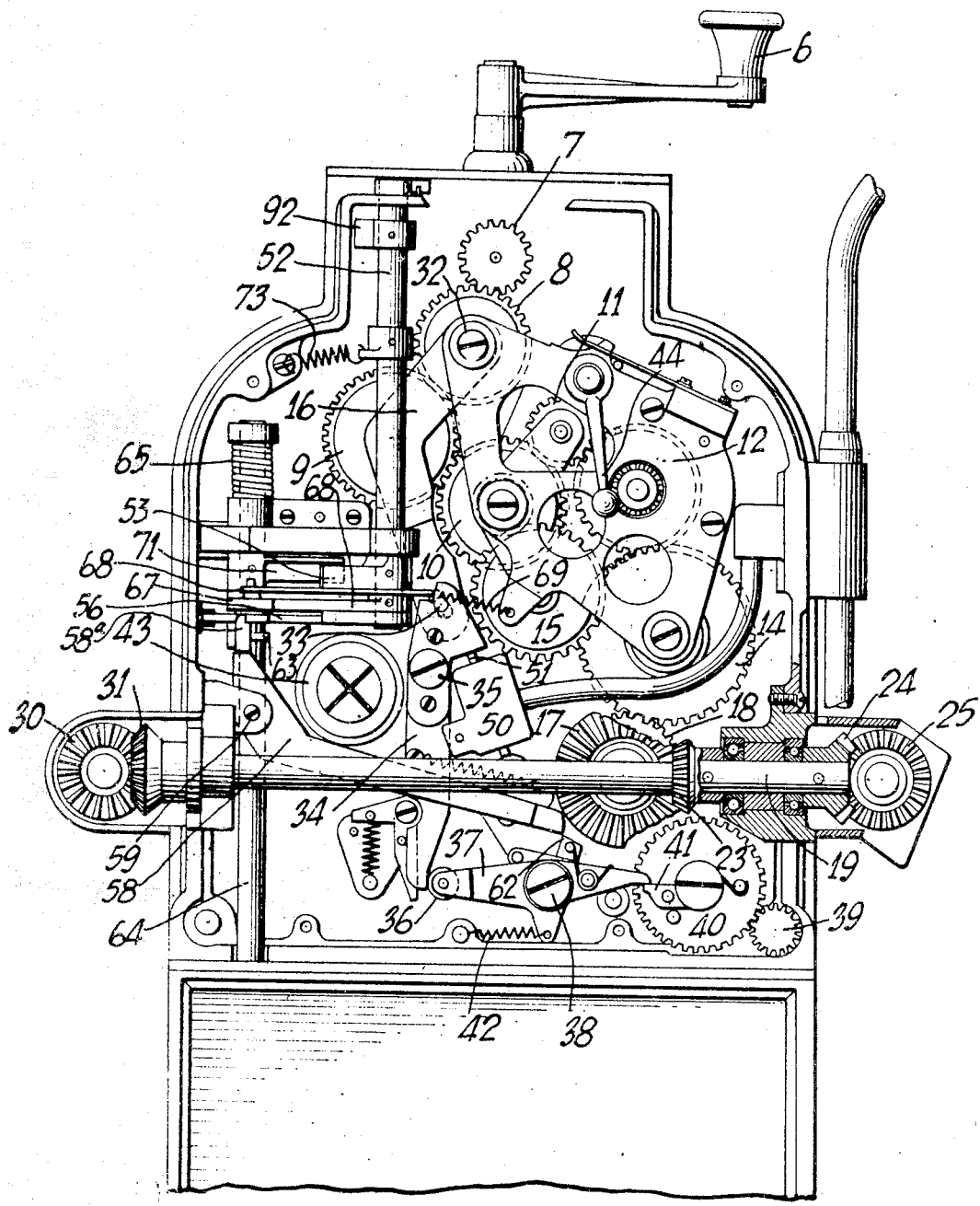
Figure 1 is a view in elevation of the operative parts for effecting the film winding and shutter tripping, a plate being removed from the upper part of the casing to reveal the same, the operative parts being shown in position for the winding of the film.

Referring more particularly to the drawings, the camera employs five lenses, one of which is centrally and horizontally arranged, as shown at 1 in Figure 10, the others 2, 3, 4 and 5 being concentrically arranged and in inclined position toward the central lens. As in other aerial cameras of this general type film magazine and shutters are provided in accordance with the number of lenses.

The manual control means for the winding of the film of the five magazines is centralized in one handle as is the control of the shutters in a single shutter tripping lever.

Referring to Figure 1, the handle for winding the film is designated at 6, a winding of which causes a rotation of the gear 7, and the gear 8 meshing therewith. A clutch arrangement is interposed at this point in the train of gears and comprises a rotary gear 10 on a stationary axis and a gear 9 adapted to mesh with gear 10, but carried by a shiftable arm 16. These two are ring gears having special teeth and disposed at the particular angular relation, as shown for instance in Figure 1, so that when the arm 16 is not held in this position by other parts of the apparatus, the tendency of the gears in their rotation is to repel each other and freely disengage so that the gear 9 may readily assume the position shown in Figure 2 and rotate freely with no driving effect on the train of gears. This type of clutch has been found to be the most suitable for the present purposes as it eliminates slippage so usual in other clutches of various kinds and the particular construction and arrangement of the meshing ring gear has been found to be perfectly free from binding or gripping of the teeth in disengagement to disengage the driving force and unusually adapted for quick and free engagement when the driving force is engaged with the train of gears.

Figure 1 shows the camera in winding position, or in other words when an exposure has been completed and it is desired to advance the exposed film out of the way and advance unexposed film over the exposure area prior to the tripping of the shutter.

The actual film roll controlling the advancement of the film for the central camera or over the centrally disposed film area is controlled by the rotation of the ring gear 12 as it rotates integrally with the shaft 81 upon which the film spool fits and is driven through the medium of the key 82. In the position shown in Figure 1 the ring gears 10, 11 and 12 mesh and are thus driven when the winding handle is turned. A ring gear 14 meshing with the ring gear 12 and ring gear 18 causes the bevel gear 17 integrally mounted therewith to rotate.

As has before been said, the winding of the single handle suffices for advancing the film over all of the five exposure areas and in order to equally distribute the forces necessarily applied to accomplish this, four long shafts are arranged to encircle the main body of the camera.

Shaft 19 carries a bevel gear 23 which is rotated by gear 17 so that the rotation is necessarily uniform throughout the shaft 19, gears 24 and 25, shaft 22, gears 26 and 27, shaft 21, gears 28 and 29, shaft 20, gears 30 and 31, and shaft 19 again, this comprising the driving mechanism for the advancement of film on all of the film rolls and constitutes a postive means for synchronizing such movement of the film over the various exposure areas.

The arm 16 which carries the shiftable gear 9 of the gear clutch 9—10, is pivoted on the fixed stud 32 and is pivotally connected at 33 to another arm 34 to form a toggle as the arm 34 moves about a fixed pivot 35. As shown in Figure 1 the other end of the arm 34 bears against a roller 36 of a lever 37 pivoted about a fixed pivot 38 and as long as the arm is thus held the clutch 9—10 is engaged and the winding of the handle 6 causes an advancement of the film through the rotation of the gears 17 and 18.

As is not an uncommon practice, especially in aerial cameras, the film is drawn by film feeding rolls over a measuring roll, such a measuring roll terminating in a ring gear as shown at 39, the primary purpose of the measuring roll being to render it impossible to advance more than a predetermined amount of film by rendering winding of the winding handle ineffective, and also to render it impossible to trip the shutter prior to completion of winding of a predetermined amount of film. As the film is drawn over the measuring roll gear 39 is rotated counterclockwise and meshing with a ring gear 40 turns the latter clockwise. The lever 37 is urged into the position shown in Figure 1 by the action of the tension spring 42. As the gear 40 rotates in a clockwise direction, the lug 41 carried thereby contacts with one end of the lever 37 and forces this end upwardly against the action of the spring. As a consequence of the lifting of one end of the lever 37 the other end thereof is lowered and the lower end of the lever 34 rides over the roller 36 and assumes the position shown in Figure 2 in which case the toggle 16—34 is straightened out and the gear clutch 9—10 is thrown out. In such a position further operation of the winding handle will not effect an advancement of the film and the camera mechanism is in proper position for allowing the tripping of the shutter.

The gear 10 rotates the gear 11 and also causes the rotation of the gear 15 which meshes with a gear 10' mounted on the gear 10 and arranged thereunderneath to rotate integrally therewith.

There is provided a differential in the train of gears whereby the effect of the manual force exerted on the winding handle may be altered and this differential is shown in Figure 3 as thrown into a different position from that in Figures 1 and 2. Through the manual shifting of the lever 44 to the right from the position shown in Figures 1 and 2 to that shown in Figure 3, the gear 11 is thrown out of mesh with gear 12 and gear 15, which was already being driven by gear 10 but which did not drive anything is thrown into mesh with gear 12 to drive the latter, gear 11 thus being still driven but not driving. Obviously the change from the small gear 11 to the larger gear 15 as an intermediate gear between gear 10 and gear 12 to drive the latter makes for a substantial change in the manual force necessary to be applied to operate the train of gears.

This arrangement is for the purpose of providing for the ease of operation of the winding handle when a comparatively small amount of film is already wound on the film take-up spool and by shifting the differential to present another operating train of gears to diminish the effort necessary to wind the handle when a considerable amount of film has been stored on this film spool.

The movement of the lever 34 besides being used to operate the gear clutch 9—10, also automatically operates the valve 51 (Figures 1, 2 and 3) for control of the vacuum intermittently brought into play to hold the film flat over the exposure area during exposure, the film being released from the action of the vacuum after film exposure in order that the film may be advanced (not shown.) After unexposed film has been advanced to its proper position for exposure the lever 34 assumes the position shown in Figure 2 due to the action of the measuring roll mechanism 39, 40, 41, etc. The movement of this lever thus induced permits the valve spring 55 (Figure 3) to press the valve 51 against its seat 50, so that the vacuum system is then closed to atmospheric pressure at this point, and the films in all the camera compartments are quickly and simultaneously pressed against the flat surfaces of the vacuum backs (not shown), due to the pressure of the outside air.

Since the vacuum system is being exhausted constantly by suitable means, the film will remain in the condition described above until valve 51 is once more opened, permitting atmospheric air to enter and tend to equalize the pressure, and release the films from their vacuum backs. The operation of opening valve 51 is combined with two other functions necessary before fresh film may be advanced, that is the exposure of the film already in position and the reengagement of the winding clutch gears 9—10. The sequence is such that the shutters are tripped before the vacuum is broken and before the clutch has been reengaged to any extent. These actions are some of the functions of the shaft 52 carrying the manual tripping lever and are combined in that operation. The desired result is automatically obtained by using an arm 53 integrally mounted on shaft 52 and projecting behind the upper end of lever 34. After the tripping action has been completed further movement causes the projecting arm 53 to press against the lever 34 at a point above its pivot 35 causing it to move over and finally assume the position shown in Figure 1 during which movement the vacuum valve 51 is raised from its seat 50 by means of a projection 54 on the arm 34 and the film thus freed from the vacuum backs. Arm 34 is held over after tripping by the action of spring 42 in urging the locking lever 37 into its path. Since the clutch gear is pivotally connected to lever 34 it is simultaneously reengaged and so locked through the same means.

In order to insure a complete cycle of manual operations, each time the camera is tripped a full stroke mechanism is employed. The locking lever 37 is the critical factor and indicates the correct point from which to govern the desired action. The mechanism consists in a pawl 56 engaging a ratchet 57 integrally mounted on the tripping lever shaft 52, which pawl 56 permits motion in a forward direction but not in a reverse direction until the lever 37 has assumed the locked position shown in Figure 1. Figures 1, 2, 6 and 7 show the pawl 56, ratchet 57 and a long bent lever 58 swinging on a fixed pivot 59 and operated by means of a spring 60 which is sufficiently strong to overcome the action of the spring 61 of a pawl 56 when the lever 58 is allowed to press against the arm 56a on the pawl. The short end 58a of the bent lever 58 lies beyond the pawl arm 56a and at the time of a correct tripping stroke a cam 62 flexibly driven by lever 37 permits the bent lever 58 to press the pawl 56 clear of the teeth of the ratchet 57, allowing the tripping lever shaft 52 to return to its starting position.

In order that pawl 56 may be operative on the next cycle, bent lever 58 is held clear by means of an arm 63 integrally mounted on the lower tripping shaft 64 which has a heavy return spring 65. It comes into play near the end of the return stroke when the teeth of the ratchet 57 have all passed the pawl 56. Unless the lever 37 has snapped into the locked position under the action of spring 42, the cam 62 which it drives will not permit the bent lever 58 to drop and release the pawl 56, so that the ratchet 57 then prevents the trip shaft 52 and lever from returning to its starting point. Thus, until the forward stroke is fully completed, the tripping lever will not return, thus providing for the correct operation of the camera.

Another feature incorporated in relation to tripping the camera is a device to prevent tripping the shutters more than once before advancing unexposed film. A long arm 66 is integrally mounted on tripping shaft 52 so as to project over the edge of a cam 67, pivotally mounted on the lower trip shaft, after a tripping operation.

Cam 67 is so held by a link 68 to which it is pivotally connected and which slides loosely between guides over the tripping lever shaft 52 normally pulling the cam 67 into operation by virtue of a tension spring 69.

Before tripping, cam 67 must be moved from the path of the arm 66 on the tripping lever shaft 52, and this is automatically accomplished by the action of the upper end of lever 34 in pushing the link 68 as the mechanism comes into correct condition for a tripping operation, that is, immediately after unexposed film has been advanced into position for exposure.

Under certain circumstances it may be desirable to repeat the tripping operation without advancing unexposed film, and the unlocking action is simply obtained by means of an eccentric cam 70 which bears against the end of the link 68 and is operated to keep the stop cam in the desired position, as shown in Figures 6 and 7.

As shown in Figure 1a there is a slight clearance 103 between the teeth of lever 34 and the unlocking link piece 68. The arm 66 projecting above the cam 67 cannot be rotated in the direction indicated by the arrow until the cam has been pushed out of the way. Since this arm 66 cannot rotate the tripping rod 52 to which it is attached it is also prevented from moving and performing the shutter tripping function. This locked condition obtains only during the period of advancement of unexposed film, that is so long as the spring 69 attached to the link 68 is able to pull the cam 67 over to the position shown. The cam does not rotate the lower trip rod 64. When unexposed film has been fully advanced into exposure position the lever 34 is unlatched and its spring pulls it over as shown in Figure 1b. It will be seen that the cam 67 has been rotated clear of the arm 66 by reason of the action of lever 34 in operating the link 68 attached to the cam 67. Thus the upper trip rod 52 may now be manually revolved through the arc necessary to perform its function and when this is done the cycle repeats itself automatically.

A clockwise movement of 40° of the tripping lever completes the tripping movement required but the first 20° of the motion is all that is required for operating the shutters while the balance of the motion is utilized for other functions associated with the shutter tripping mechanism.

Referring to Figure 6 there will be seen that the tripping action of 20° is transmitted to the lower shaft 64 through the cam operated arm 71 having a roller 72 at its end. After the cam 53 has been moved 20° the roller 72 reaches a long dwell and its arm 71 receives no further rotation, cam 53 continues forward for a further 20° to complete the tripping stroke, and then returns to its original position. Roller arm 71 is integrally mounted on the lower trip shaft 64 which is thus rotated forward through a small arc to operate the shutters. A heavy return spring 65 keeps the roller 72 pressed against the face of a cam 53 at all times and similarly the tripping lever shaft 52 is returned against a fixed stop by means of a tension spring 73.

The lenses with their individual shutters are arranged as shown in Figures 9 and 10. Rotatably mounted on the center chamber 74 is a large ring gear 75 which receives through a sector 76 the small angular motion used in tripping the shutters. This motion is relayed from the ring 75 to the shutter plunger rods 77 by means of a system of cams 78 and levers 79.

In order to synchronize the shutters, each cam is provided with an eccentric screw 80 for varying the pitch of the faces of cams 78. The movement of the ring gear 75 during a tripping scale is simply one oscillation forward and back of about 15°.

As will be seen in Figures 11 to 16 inclusive the gear 7 is integral with the shaft 83 which is driven through the medium of a bevel gear 84 keyed to it at the opposite end to the ring gear 7. The bevel gear 84 is operated by means of a bevel pinion mounted integrally with the winding handle shaft 86. This system of gearing is contained in a suitable chamber 87 on the main body of the camera and is provided with a cover 88, a part of which also acts as the upper bearing support for the handle shaft 86. Normally, in operating the camera, the winding handle is turned clockwise until unexposed film has been fully advanced when the above described measuring roll mechanism causes the gear clutch to throw out when the camera is ready for tripping.

In order to prevent incorrect operation of the winding system, it is necessary to provide a suitable means whereby film cannot be advanced until after the camera has been fully tripped, and the tripping lever allowed to return to its starting position under the action of its return spring 73, hence the latch 89 is provided to stop forward winding of film, and comes into action by virtue of a coil spring 90 whenever the tripping lever is moved from its zero position. This result is effected by means of a long rod 91 which is a sliding fit in suitable apertures in the housing 87, and is moved in an endwise direction by means of an arm 92 mounted integrally with the tripping lever shaft 52. A compression spring 93 maintains the rod 91 against the arm 92 in all stages of the motion imparted thereby. A conical shaped collar 94 is mounted integrally with a rod 91 and consequently moves with it. With the tripping handle at zero position the rod 91 is pressed to the right against the face of arm 92 under the action of the spring 93 and the conical collar holds the latch 89 clear of a stop-piece 95 mounted integrally with bevel gear 84 and rotating therewith in the action of winding.

Whenever the tripping lever is moved from zero position, rod 91 is moved to the left by arm 92 and consequently the latch 89 is pushed by its coil spring 90 into the path of the rotating stop-piece 95 carried by the bevel gear 84 so that any attempt to wind the camera must cease when stop-piece 95 strikes latch 89. A similar latch 96 operates automatically by means of its coil spring 97 to check winding in the reverse direction when stop-piece 95 strikes it. Motion from the rod 91 is relayed through a rocking lever 98 and is used to operate stop-watch 99.

Similarly a ratchet type counter 100 is actuated by means of a lever 101 pushed by collar 102 on rod 91.

Having thus described our invention, we claim:

1. In an aerial camera, film advancing means and shutter setting means controlled thereby, shutter tripping means, a measuring roll over which said film is drawn, said film advancing means including a winding member and clutch therefor, means actuated by said measuring roll for controlling the operation of said clutch and thereby said film and shutter operating means and comprising devices for predeterminedly limiting the amount of film which may be advanced between exposures and for rendering ineffective the operation of said winding member toward further film advancement prior to exposure or toward exposure prior to the advancement of a predetermined amount of film.

2. In an aerial camera, film advancing means and shutter setting means controlled thereby, shutter tripping means, a measuring roll over which said film is drawn, means actuated by said measuring roll for controlling the operation of said film and shutter operating means and comprising devices for predeterminedly limiting the amount of film which may be advanced between exposures and for rendering ineffective any effort toward further advancement prior to exposure or toward exposure prior to the advancement of a predetermined amount of film, said devices comprising a train of gears, including a gear clutch, for advancing said film and setting said shutter, a system of levers resiliently actuated and under the control of said measuring roll for effecting the engagement and disengagement of said gear clutch and for locking and releasing devices restraining the operation of said shutter operating devices.

3. In an aerial camera, film advancing means and shutter setting means controlled thereby, shutter tripping means, a measuring roll over which said film is drawn, means actuated by said measuring roll for controlling the operation of said film and shutter operating means and comprising devices for predeterminedly limiting the amount of film which may be advanced between exposures and for rendering ineffective any effort toward further advancement prior to exposure or toward exposure prior to the advancement of a predetermined amount of film, said devices comprising a train of gears, including a gear clutch, for advancing said film and setting said shutter, a system of levers resiliently actuated and under the control of said measuring roll for effecting the engagement and disengagement of said gear clutch and for locking and releasing devices restraining the operation of said shutter operating devices, said gear clutch being the connecting medium between the winding control member and the gears by which the film is advanced and comprising a pair of gears having their axes of rotation in different horizontal planes, one of said axes being stationary and the other movable and indirectly under the control of said measuring roll, the teeth of said gears being of such dimensions that upon a release of positive pressure forcing said gears into mesh they automatically repel each other and become unmeshed without binding.

4. In an aerial camera, film advancing means and shutter setting means controlled thereby, shutter tripping means, a measuring roll over which said film is drawn, means actuated by said measuring roll for controlling the operation of said film and shutter operating means and comprising devices for predeterminedly limiting the amount of film which may be advanced between exposures and for rending ineffective any effort toward further advancement prior to exposure or toward exposure prior to the advancement of a predetermined amount of film, said devices comprising a train of gears, including a gear clutch, for advancing said film and setting said shutter, a system of levers resiliently actuated and under the control of said measuring roll for effecting the engagement and disengagement of said gear clutch and for locking and releasing devices restraining the operation of said shutter operating devices, said gear clutch being the connecting medium between the winding control member and the gears by which the film is advanced and comprising a pair of gears having their axes of rotation in different horizontal planes, one of said axes being stationary and the other movable and indirectly under the control of said measuring roll, the teeth of said gears being of such dimensions that upon a release of positive pressure forcing said gears into mesh they automatically repel each other and become unmeshed without binding, said train of gears also including a plurality of gears to form between the film winding control and the film winding spool of said camera a differential, and a manually operable lever for operating said differential.

5. In an aerial camera, film advancing means and shutter setting means controlled thereby, shutter tripping means, a measuring roll over which said film is drawn, means actuated by said measuring roll for controlling the operation of said film and shutter operating means and comprising devices for predeterminedly limiting the amount of film which may be advanced between exposures and for rendering ineffective any effort toward further advancement prior to exposure or toward exposure prior to the advancement of a predetermined amount of film, said devices comprising a train of gears, including a gear clutch, for advancing said film and setting said shutter, a system of levers resiliently actuated and under the control of said measuring roll for effecting the engagement and disengagement of said gear clutch and for locking and releasing devices restraining the operation of said shutter operating devices, said gear clutch being the connecting medium between the winding control member and the gears by which the film is advanced and comprising a pair of gears having their axes of rotation in different horizontal planes, one of said axes being stationary and the other movable and indirectly under the control of said measuring roll, the teeth of said gears being of such dimensions that upon a release of positive pressure forcing said gears into mesh they automatically repel each other and become unmeshed without binding, said devices comprising a train of gears including a differential between the film winding control and the film winding spool of said camera, and a manually operable lever for operating said differential.

6. In an aerial film camera, means for advancing the film, means for tripping and setting the shutter, and means for creating a vacuum to hold the film flat over the exposure area during exposure, a measuring roll over which said film is drawn, a single member under the control of said measuring roll and carrying the necessary devices for operating the means for said vacuum system and for setting said shutter and for rendering said shutter tripping and film advancing means operative and inoperative all in a proper and predetermined sequence.

7. In an aerial film camera, a train of gears for advancing the film and a manual wind for said gears, a shutter tripping device comprising a shaft under manual control and devices operated thereby, a second shaft associated with said first shaft for setting said shutter, a gear clutch in said train of gears, a vacuum system for holding said film flat over the exposure area during exposure, a measuring roll over which said film is drawn, levers periodically actuated by said measuring roll for actuating a valve of said vacuum system for locking and releasing said first and second shafts and for causing the engagement and disengagement of said gear clutch in predetermined sequence.

8. In a multi-lens camera, a train of gears comprising a gear clutch for advancing film over the various exposure areas and means for synchronizing said movement of film, a plurality of shutters and a shutter tripping device comprising a manual lever operated shaft and synchronized means operated thereby to cause the simultaneous tripping of said shutters, a second shaft associated with said first shaft for controlling mechanism associated with said shutter tripping mechanism, means for holding said film flat over each of said exposure areas during exposure, a measuring roll over which said film is drawn, a rocking lever adapted to be operated by said measuring roll upon each complete revolution thereof a single flexible lever operated by said rocking lever, said flexible lever carrying one of the gears of said gear clutch and adapted to control the engagement and disengagement thereof, and carrying a member for operating a valve of said vacuum system and thereby controlling the operation of the latter, and carrying latch devices for controlling the operation of said shutter tripping shaft, and a second lever controlled by said rocking lever for controlling the operation of said second shaft for controlling mechanism associated with said shutter tripping mechanism.

9. In an aerial camera comprising a manually operable mechanism for advancing the film and for setting and tripping the shutter, and a measuring roll over which said film is drawn, said film advancing means comprising a train of gears including a gear clutch, a single flexible lever indirectly and predeterminedly controlled by said measuring roll, said flexible lever carrying one of the gears of said clutch and thereby controlling the engagement and disengagement thereof, said flexible lever also carrying latch devices for controlling the manually operable device for tripping the shutter, to provide for a predetermined sequence of operation of the entire camera mechanism manually initiated.

10. In a multi-lens aerial camera comprising a manually operable mechanism for advancing the film and for setting and tripping the shutters, and means for synchronizing the movement of the film over the various exposure areas and for synchronizing the setting and tripping of all of said shutters, a measuring roll over which said film is drawn, said film advancing means comprising a train of gears including a gear clutch, a single flexible lever indirectly controlled at predetermined intervals by said measuring roll, said flexible lever carrying one of the gears of said gear clutch and thereby controlling the engagement and disengagement thereof, said flexible lever also carrying latch devices for controlling the manually operable device for tripping the shutter, to provide for a predetermined sequence and synchronization of operation of the entire camera mechanism and the exposure units manually initiated.

11. In an aerial film camera, means for advancing the film, means for tripping and setting the shutter, and means for holding the film flat over the exposure area during exposure, a measuring roll over which said film is drawn, a member under the control of said measuring roll and carrying the necessary devices for operating the means for holding said film flat and for setting said shutter and for rendering said shutter tripping and film advancing means operative and inoperative all in a proper and predetermined sequence.

12. In an aerial film camera, a train of gears for advancing the film and a manual wind for said gears, a shutter tripping device comprising a shaft under manual control and devices operated thereby, a second shaft associated with said first shaft for setting said shutter, a gear clutch in said train of gears, means for holding said film flat over the exposure area during exposure, a measuring roll over which said film is drawn, means periodically actuated by said measuring roll for actuating said first named means for locking and releasing said first and second shafts and for causing the engagement and disengagement of said gear clutch in predetermined sequence.

13. In a multi-lens aerial camera comprising a manually operable mechanism for advancing the film and for setting and tripping the shutters, and means for synchronizing the movement of the film over the various exposure areas and for synchronizing the setting and tripping of all of said shutters, a measuring roll over which said film is drawn, said film advancing means comprising a winding member and a clutch therefor, means indirectly controlled at predetermined intervals by said measuring roll, said last named means carrying one of the elements of said clutch and thereby controlling the engagement and disengagement thereof, said same means also carrying latch devices for controlling the manually operable device for tripping the shutter, to provide for a predetermined sequence and synchronization of operation of the entire camera mechanism and the exposure units manually initiated.

14. In a multi-lens aerial camera, film advancing means and shutter setting means controlled thereby, shutter tripping means, means for synchronizing the movement of the film over the various exposure areas and for synchronizing the setting and tripping of all of said shutters, a measuring roll over which said film is drawn, said film advancing means including a winding member and a clutch therefor, means actuated by said measuring roll for controlling the operation of said clutch and thereby said film and shutter operating means and comprising devices for predeterminedly limiting the amount of film which may be advanced between exposures and for rendering ineffective the operation of said winding member towards further film advancement prior to the exposure or toward exposure prior to the advancement of a predetermined amount of film.

In testimony whereof, we have signed our names to this specification, this 30th day of June, 1931.

FREDERICK W. LUTZ.
AMBROSIUS BRIECHLE.
GEORGE RATTRAY.